(12) United States Patent
Scheele et al.

(10) Patent No.: US 8,867,692 B2
(45) Date of Patent: Oct. 21, 2014

(54) SYSTEMS AND METHODS FOR TREATING MATERIAL

(75) Inventors: Randall D. Scheele, Richland, WA (US); Bruce K. McNamara, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 865 days.

(21) Appl. No.: 12/511,573

(22) Filed: Jul. 29, 2009

(65) Prior Publication Data
US 2012/0156115 A1  Jun. 21, 2012

Related U.S. Application Data

(60) Provisional application No. 61/084,352, filed on Jul. 29, 2008.

(51) Int. Cl.
| | |
|---|---|
| *G21C 3/00* | (2006.01) |
| *C01G 43/06* | (2006.01) |
| *C01G 1/06* | (2006.01) |
| *C01G 56/00* | (2006.01) |
| *C01G 55/00* | (2006.01) |
| *C22B 60/02* | (2006.01) |
| *C01G 39/04* | (2006.01) |
| *C01B 9/08* | (2006.01) |

(52) U.S. Cl.
CPC ......... *C22B 60/0208* (2013.01); *C01P 2002/88* (2013.01); *C01P 2006/34* (2013.01); *C01G 43/066* (2013.01); *C01P 2006/35* (2013.01); *C01G 1/06* (2013.01); *C01G 56/007* (2013.01); *C01G 55/005* (2013.01); *C01G 39/04* (2013.01)
USPC .......................................... 376/419; 423/489

(58) Field of Classification Search
CPC ..... C01G 55/005; C01G 39/04; C22B 60/0208
USPC ............................. 342/419; 423/489; 376/419
See application file for complete search history.

(56) References Cited

U.S. PATENT DOCUMENTS

| | | | |
|---|---|---|---|
| 3,429,669 | A | 2/1969 | Camozzo et al. |
| 4,960,581 | A | 10/1990 | Harada et al. |

(Continued)

FOREIGN PATENT DOCUMENTS

WO   WO 2007/053128 A1   5/2007

OTHER PUBLICATIONS

Levitz et al., "Engineering Develompment of Fuiid-Bed Fluoride Volatility Processes", Part 14, "Processing Experience in Fluorinating Plutonium Materials and Thermally Decomposing Plutonium Hexafluoride in the Engineering-scale Alpha Facility", Argonne National Laboratory, ANL-7473, Nov. 1969.*

(Continued)

*Primary Examiner* — Frank J McGue
(74) *Attorney, Agent, or Firm* — Wells St. John P.S.

(57) ABSTRACT

Systems for treating material are provided that can include a vessel defining a volume, at least one conduit coupled to the vessel and in fluid communication with the vessel, material within the vessel, and $NF_3$ material within the conduit. Methods for fluorinating material are provided that can include exposing the material to $NF_3$ to fluorinate at least a portion of the material. Methods for separating components of material are also provided that can include exposing the material to $NF_3$ to at least partially fluorinate a portion of the material, and separating at least one fluorinated component of the fluorinated portion from the material. The materials exposed to the $NF_3$ material can include but are not limited to one or more of U, Ru, Rh, Mo, Tc, Np, Pu, Sb, Ag, Am, Sn, Zr, Cs, Th, and/or Rb.

16 Claims, 3 Drawing Sheets

(56) References Cited

U.S. PATENT DOCUMENTS

| | | | |
|---|---|---|---|
| 5,505,927 A | * | 4/1996 | Nieuwenhuis ............... 423/258 |
| 7,323,153 B2 | * | 1/2008 | Amamoto et al. ............ 423/251 |

OTHER PUBLICATIONS

Ogata et al., "Fluorination Reaction of Uranium Dioxide by Fluorine", Journal of Nuclear Science and Technology, 41:2, 135-141, 2004.*

WO PCT/US2009/052149, Jan. 28, 2010, Written Opinion.

WO PCT/US2009/052149, Jan. 28, 2010, Search Report.

Kirk Sorensen "Closed-Cycle Fluorination/Reduction?" Energy from Thorium Discussion Forum (Online) Nov. 2007, pp. 1-11. URL: http://www.energyfromthorium.com/forum/viewtopic.php?f=4&t=433&sid=034ad9150eedc56e7395e58a0d51d6f2>, retrieved Nov. 1, 2010.

D. Haas, et al., "Fuel cycle strategies and plutonium management in Europe", Progress in Nuclear Energy 49 (2007) 574-582.

G.R. Dyck, et al., "Application of Fluoride Volatility to the Recycling of LWR Spent Fuel into CANDU", Proceedings of GLOBAL 2005, Paper No. 493.

Hiroaki Kobayashi, et al., "Fluorex Reprocessing System for the Thermal Reactors Cycle and Future Thermal/Fast Reactors (Coexistence) Cycle", Progress in Nuclear Energy, vol. 47, No. 1-4, pp. 380-388, 2005.

Jan Uhlir, et al., "Fluoride volatility method for reprocessing of LWR and FR fuels", Journal of Fluorine Chemistry 130 (2009) 89-83.

M. Kamoshida, et al., "A New Concept for the Nuclear Fuel Recycle System: Application of the Fluoride Volatility Reprocessing", Progress in Nuclear Energy, vol. 37, No. 1-4, pp. 145-150, 2000.

R. V. Ostvald, "Fluoride Processes as Perspective Methods of the Irradiated Nuclear Fuel Reprocessing", Modern Technique and Technologies 2002, Section 8, pp. 196-198.

V.V. Shatalov, et al., "Gas-Fluoride Technology for Processing Spent Oxide Fuel", Atomic Energy, vol. 90, No. 3, 2001, pp. 224-234.

Yuko Kani, et al., "New reprocessing system for spent nuclear reactor fuel using fluoride volatility method", Journal of Fluorine Chemistry 130 (2009) 74-82.

* cited by examiner

SYSTEMS AND METHODS FOR TREATING MATERIAL

CROSS REFERENCE TO RELATED APPLICATION

This application claims priority to U.S. Provisional Patent Application Ser. No. 61/084,352 entitled "Application of Nitrogen Trifluoride in the Nuclear Fuel Cycle", which was filed on filed Jul. 29, 2008, the entirety of which is incorporated by reference herein.

GOVERNMENT RIGHTS STATEMENT

This invention was made with Government support under Contract DE-AC26-03NT42009 awarded by the U.S. Department of Energy. The Government has certain rights in the invention.

TECHNICAL FIELD

The present disclosure relates to systems and methods for treating material. Particular embodiments of the disclosure describe systems and/or methods for treating uranium material, actinide material, and/or fission product materials.

BACKGROUND

For a variety of reasons, it can be desirable to treat either mined or created materials. This treatment can include alteration to create another form of the material or components of the material that allows for specific processing and/or alternative separation techniques to be utilized, for example. Components of materials that can make alternative treatment, specific processing, and/or separation techniques desirable include but are not limited to toxic, regulated, and/or valuable materials such as uranium materials, actinide materials, and/or fission materials.

As an example, uranium materials can be treated to provide a uranium fluoride material which can be used in the uranium fuel cycle. Uranium fluorination is performed in the existing nuclear fuel cycle to fluorinate uranium recovered both from ore and/or from spent nuclear fuel. These fluorination processes rely on many hazardous, highly reactive, and highly toxic fluorinating agents. As an example of a currently used process, in a reprocessing plant, uranium is recovered as uranyl nitrate hexahydrate (UNH), calcined to uranium trioxide ($UO_3$), reduced to uranium dioxide ($UO_2$) using hydrogen derived from cracked ammonia, converted to $UF_4$ by HF (NFPA rating Health=3; Reactivity=2) at 300 to 500° C., and finally converted to $UF_6$ by $F_2$ (NFPA rating Health=4; Reactivity=4) at 500° C. The process for converting natural uranium to $UF_6$ is similar.

Fluorinating agents used or proposed for use in the fluoride volatility-based reprocessing approach include hydrogen fluoride (HF) and/or diatomic fluorine ($F_2$), difluorodioxide (FOOF), chlorine trifluoride ($ClF_3$), and bromine trifluoride ($BrF_3$). These fluorinating agents are considered highly toxic, highly reactive, and hazardous and some can produce hazardous by-products. In particular, $ClF_3$ fluorination by-products are explosive or can react explosively with water or organics. These highly toxic reagents necessitate the use of substantial safety and environmental controls. These controls can add substantial cost to the processing of uranium materials.

SUMMARY OF THE DISCLOSURE

Systems for treating material are provided that can include a vessel defining a volume, at least one conduit coupled to the vessel and in fluid communication with the vessel, $NF_3$ material within the conduit, and material within the vessel, the material including one or more actinides and/or fission products such as but not limited to U, Ru, Rh, Mo, Tc, Np, Pu, Sb, Ag, Am, Sn, Zr, Cs, Th, and/or Rb.

Methods for fluorinating material are provided that can include exposing the material to $NF_3$ material to fluorinate at least a portion of the material. The material exposed to the $NF_3$ material can include one or more actinides and/or fission products such as but not limited to U, Ru, Rh, Mo, Tc, Np, Pu, Sb, Ag, Am, Sn, Zr, Cs, Th, and/or Rb.

Methods for separating components of material are also provided that can include exposing the material to $NF_3$ material to at least partially fluorinate a portion of the material, and separating at least one fluorinated component of the fluorinated portion from the material. The material exposed to the $NF_3$ material can include one or more actinides and/or fission products such as but not limited to U, Ru, Rh, Mo, Tc, Np, Pu, Sb, Ag, Am, Sn, Zr, Cs, Th, and/or Rb.

BRIEF DESCRIPTION OF THE DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8). Systems and methods for treating uranium material are provided with reference to FIGS. 1-3.

Figure 1:
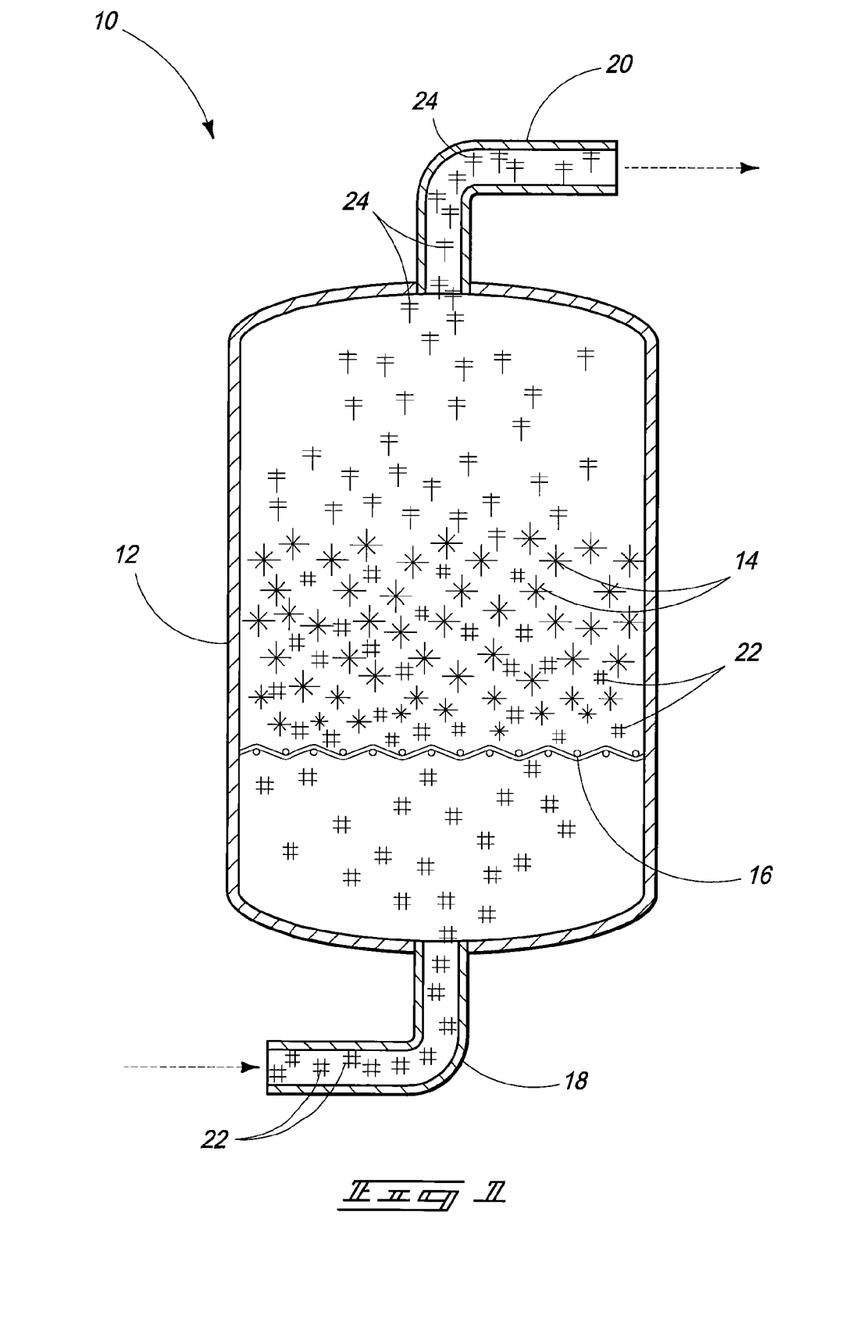
FIG. 1 is a system according to an embodiment of the disclosure.

Referring to FIG. 1, a system 10 is shown that includes a vessel 12 defining a volume, and housing material 14(·). Vessel 12 can be constructed of inorganically inert materials capable of withstanding extreme temperatures and configured to heat the volume and material 14. This disclosure should not be limited to how vessel 12 is depicted. Vessel 12 is an example of one of many vessels that may be utilized according to the methods and systems of the present disclosure. Material 14 can be supported by support 16. Support 16 can be constructed of an inert mesh material and provide support for material 14 as well as passageways for reactants.

Material 14 can include material previously fluorinated utilizing the harsh fluorinating techniques utilized in the past. Material 14 can include one or more actinides and/or fission products such as but not limited to U, Ru, Rh, Mo, Tc, Np, Pu, Sb, Ag, Am, Sn, Zr, Cs, Th, and/or Rb. Material 14 can be a material that is utilized in the nuclear fuel cycle, so-called nuclear materials. Material 14 can be a uranium material, a plutonium material, and/or a thorium based material.

Material 14 can be a uranium material. The uranium material can include one or more of uranium ore, uranium oxide, processed or even partially processed uranium, slag uranium, nuclear fuel, irradiated nuclear fuel, uranium yellow cake, and/or spent nuclear fuel. Material 14 can be considered a uranium material, regardless of the amount of uranium material. For example, coal ash containing 0.25% to about 0.5% (wt./wt.) uranium can be considered a uranium material. The uranium material can include actinides. The uranium material can include Pu, Np, Mo, Ru, and Tc, for example.

Material 14 can also be substantially free of uranium and include actinides and/or fission products. Material 14 can include one or more of Pu, Np, Mo, Ru, and Tc, as well as one or more of the non-fluorinated and/or fluorinated elements listed in Tables 1 and/or 2 below.

Material 14 can be a pure, heterogeneous, or homogenous blend of solid material. The material can be pelletized to a predefined uniform size, for example. Material 14 may be acquired from multiple sources and some of these sources can dictate the application of the systems and methods of the present disclosure. Material 14 may have been treated to remove other materials. For example, material 14 may have been fluorinated to remove uranium and/or specific fission products.

For example, and in accordance with implementations of embodiments of the disclosure, the systems and methods of the present disclosure can also be utilized in any other industry wherein fluorination may be desired as a part of a processing strategy; this includes but is not limited to applications such as mining (the treatment of slag containing elements and/or equivalent elements to the elements described herein), environmental remediation (the treatment of RCRA waste containing elements and/or equivalent elements to the elements described herein), waste treatment, and/or other applications.

Conduits 18 and 20 can be coupled with vessel 12. These conduits can be configured to convey gaseous materials such as reactants and/or products. The conduits may be configured with valves to control flow within same and/or may be constructed of inert materials such as those used to construct vessel 12. In accordance with an example embodiment, conduit 18 may be configured to convey material 22 (#).

Material 22 can include $NF_3$ as well as other components, such as Ar and/or $N_2$, for example. Part or all of material 22 can be in the gaseous phase and may be heated prior to entering the conduit to accomplish same. The present disclosure provides that $NF_3$ is an effective fluorinating agent for converting uranium compounds to the volatile uranium fluoride compounds such as $UF_6$ which is the feed stock into the uranium enrichment processes.

$NF_3$ can be considered mildly toxic in comparison to the toxic and extremely toxic fluorinating reagents described in the background. Utilizing $NF_3$ can substantially eliminate most, if not all, of the hazards associated with the existing fluorinating agents. $NF_3$ can be considered non-reactive at room temperature, having the toxicity equivalent to moth balls, while exhibiting similar thermal fluorinating power to that of $F_2$ or HF, in these applications. $NF_3$ has low toxicity and a non-reactive character (NFPA Rating Health=1; Reactivity=0), and can be used to replace the highly toxic and highly reactive HF and $F_2$ as the fluorination agent of choice in many stages of the nuclear fuel cycle.

By directly substituting $NF_3$ material, 1) the safety of nuclear processing operations can be dramatically improved over existing fluorinating agents and 2) different thermal reaction sensitivities and volatilities can be leveraged to provide an improved fluoride volatility reprocessing flow sheet. The minimal toxicity of $NF_3$ gives it a distinct advantage over highly toxic HF and $F_2$. The lesser reactivity of $NF_3$ compared to HF and $F_2$ offers the potential to improve the selectivity of the thermal fluorination reaction and selectively convert spent fuel constituents to volatile fluorides thus enhancing purification factors for the valuable fuel and other constituents. These features might be leveraged to provide proliferation resistance.

In accordance with example implementations, material 22 can be exposed to material 14 within vessel 12 to form a fluorinated material 24 (‡). Fluorinated material 24 can have substantially different physical properties of portions or all of material 14. In accordance with example implementations, the systems and methods of the present disclosure can be utilized to take advantage of the differences in these physical properties. For example, material 14 may have melting, sublimation, and/or boiling points substantially different than melting, sublimation, and/or boiling points of portions or all of fluorinated material 24. As such, material 14 may be exposed to material 22 at a temperature and/or pressure that provides for the fluorination and/or removal of specific elements of material 14. For example, a majority of elements of material 14 may be fluorinated at one temperature, but only specific fluorinated elements may be volatile and/or removed from material 14 at this same temperature. By dynamically configuring system 10 through temperature and/or pressure ramps, portions of material 14 can be extracted and/or purified. The systems and methods of the present disclosure can include dynamically controlling the temperature of the contents of vessel 12 to selectively fluorinate portions of material 14 and mobilize the fluorinated material 24, such as volatilizing the fluorinated material 24. This can separate a fluorinated portion of the uranium material from the uranium material.

In accordance with a particular embodiment, material 14 can include uranium oxide (such as $UO_2$ and/or $UO_3$) and this uranium oxide can be exposed to $NF_3$ material 22 to form fluorinated material 24 that can include U and F, such as $UF_6$, for example. $UF_6$ has substantially different physical properties than uranium oxide. In the case where the volume of vessel 12 is maintained above the sublimation point or above the boiling point of $UF_6$ but below the melting point of uranium oxide, the $UF_6$ generated can be conveyed into conduit 20 and thus separated from the remaining material 14.

The temperature of the contents of vessel 12 may be manipulated to facilitate the dynamic fluorination and separation of materials. The temperature of the contents may be controlled to provide a minimum temperature of 50° C. which can be sufficient to facilitate the fluorination of U metal. As an example, a temperature within the volume of vessel 12 may be greater than 400° C. Material 24 need not necessarily be in the gaseous phase to be removed from vessel 12; material 24 can be composed of liquid and gases and conveyed to conduit 20 through flow regulation of the material 22 received from conduit 18. In accordance with example implementations, the mildly toxic $NF_3$ can be used as a fluorinating agent for uranium and other actinides and fission products to form volatile or non-volatile fluorides of same.

This is just one example of a system and method that can be used to significantly reduce the number of and simplify the process steps required to recover the valuable fuel and chemical (e.g. noble and precious metals) constituents in spent nuclear fuel. Through reducing and/or simplifying the process steps, the systems and methods of the present disclosure can leave a substantially smaller environmental footprint than the PUREX reprocessing flow of the prior art.

Example industrial applications of the systems and methods of the current disclosure include, but are not limited to: 1) conversion of uranium yellow cake (or precursors) recovered from uranium ores to the volatile $UF_6$; 2) converting uranium dioxide ($UO_2$) recovered from nuclear fuel reprocessing to $UF_6$; 3) reprocessing of uranium recovered from spent nuclear fuel reprocessing or recycle plants; 4) pretreating to affect the release of volatile fission products such as iodine, tritium, and/or krypton from spent nuclear fuel; and/or 5)

converting U, $UO_2$, Pu, $PuO_2$, and potentially other actinide oxides and metals to volatile fluorides to separate them from fission products (replacement fluorinating gas in the fluoride volatility nuclear fuel recycle process).

The systems and methods of the present disclosure can be utilized throughout the nuclear fuel cycle. $NF_3$ can be used to effectively fluorinate and convert various uranium oxidation states and compounds to the volatile uranium hexafluoride, which is the uranium process gas used in uranium isotope enrichment plants. $NF_3$ can be used to fluorinate other actinides and fission products to volatile or non-volatile compounds.

Thermogravimetric (TG) and differential thermal analysis (DTA) methods can be used to determine the thermal sensitivity and effectiveness of $NF_3$ as a fluorinating agent for converting uranium metal and various uranium oxides, oxyfluorides, and fluorides to the volatile $UF_6$, for example. To accommodate the reactivity of $NF_3$, the thermoanalytical instrument can be modified to have only nickel surfaces exposed to the high temperature gas. TG can measure mass change and DTA can measure temperature differences between the sample and a reference material at isothermal conditions or as the sample is heated or cooled at controlled rates under a controlled non-reactive or reactive gas atmosphere.

Both methods provide thermal reaction sensitivities and reaction kinetics. Mass changes can provide insights on the reaction path. The heat changes observed by the DTA can provide whether a reaction is endothermic (requires heat) or exothermic (produces heat). Exothermicity can indicate that the reaction will proceed easily while endothermicity can indicate that heat must be provided to make a reaction occur.

Figure 2:
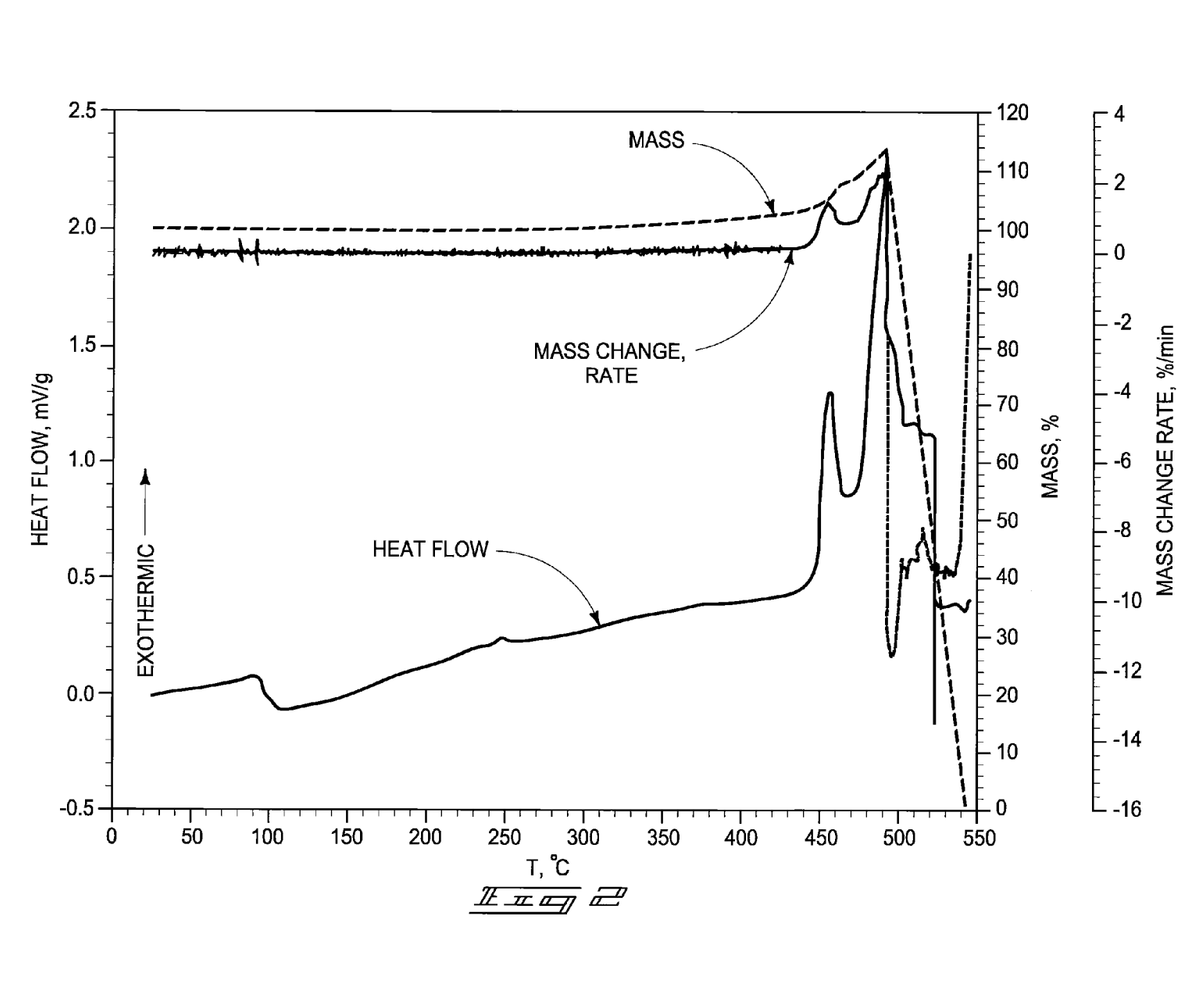
FIG. 2 is a depiction of data that may be acquired utilizing an embodiment of the systems and/or methods of the present disclosure.
Figure 3:
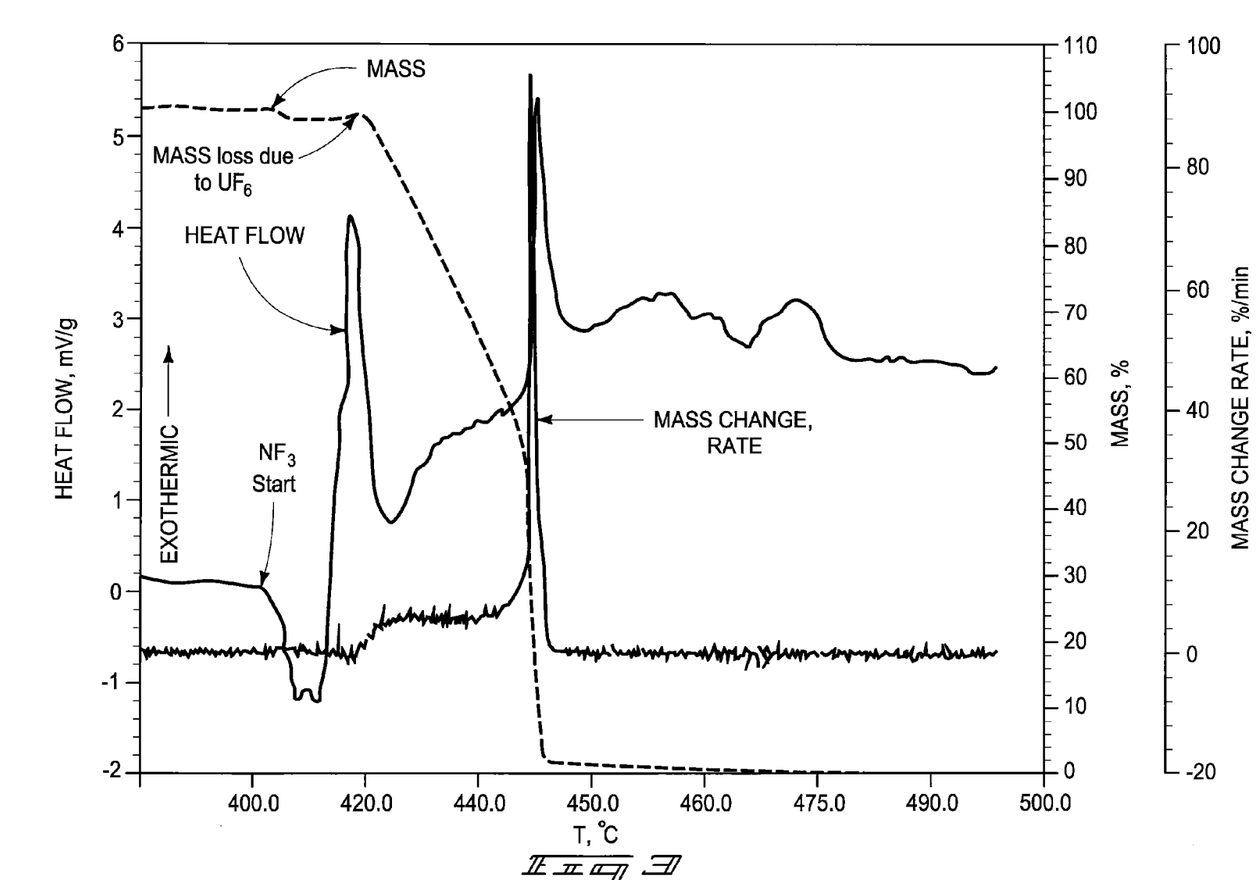
FIG. 3 is a depiction of data that may be acquired utilizing an embodiment of the systems and/or methods of the present disclosure.

As illustrated in FIG. 2 for $UO_2$ and FIG. 3 for $UO_3$, $NF_3$ material can convert uranium oxides to $UF_6$ at temperatures near 400° C. when heated at 0.083 K/s in flowing 5% $NF_3$/Ar. Similar positive results can be obtained for triuranium octaoxide ($U_3O_8$).

FIG. 2 illustrates that after some preliminary exothermic reactions (heat flow plot), $NF_3$ substantially converts the $UO_2$ to $UF_6$ (mass plot). FIG. 3 shows that after an initial exothermic (heat flow plot) reaction, $NF_3$ substantially converts $UO_3$ to $UF_6$ (mass plot) in an exothermic reaction. Comparison of FIG. 2 with FIG. 3 illustrates the differences in thermal sensitivities that might be leveraged to recover valuable fuel constituents and differences in reaction pathways as these uranium oxides are converted to $UF_6$. Similar positive results can be obtained for uranium metal, triuranium octaoxide, uranium tetrafluoride, uranyl fluoride, ruthenium dioxide, molybdenum oxides, and/or for technetium compounds.

$NF_3$ is an effective fluorinating/oxidizing agent for both uranium and technetium (Tc) compounds. $NF_3$ can effectively convert uranyl fluoride ($UO_2F_2$) and uranium tetrafluoride ($UF_4$) to volatile $UF_6$, and technetium dioxide ($TcO_2$) and/or pertechnetate to volatile technetium hexafluoride ($TcF_6$). Thermoanalytical data demonstrates that thermal $NF_3$ can successfully convert uranium metal and the common uranium oxides uranium dioxide ($UO_2$), triuranium octaoxide ($U_3O_8$), and uranium trioxide ($UO_3$) to $UF_6$.

The ability of certain actinides to form volatile fluorides has played a significant role in the nuclear fuel cycle and has the potential to play a more significant role as the basis for a compact reprocessing approach. The systems and methods of the present disclosure may be utilized during fluoride volatility reprocessing flow sheet or as a pretreatment to cause release of volatile radioactive fission products iodine-129, tritium, and krypton, or to convert recovered uranium to uranium hexafluoride for isotopic re-enrichment.

Table 1 below provides the thermogravimetric analyzer (TGA)-measured onset temperatures for the nitrogen trifluoride ($NF_3$)-fluorination (10% $NF_3$ in argon) of several uranium compounds and fission products that form volatile fluorides. These can be determined at varied rates such as isothermal, 2, 5 or 10° C./min; heating rate can affect the measured onset temperature and in general significant reaction rates will occur at temperatures up to 100° C. less than the TGA-measured onset temperature. In addition to the TGA heating rate, the measured fluorination temperatures depend on a number of factors including particle size and fluorination gas concentration. In accordance with example implementations, $NF_3$ can be an effective fluorination agent from temperatures ranging from room temperature to over 600° C.

TABLE 1

Thermogravimetric Analyzer (TGA)-Measured Onset Temperatures for Fluorination Reactions with 10% Nitrogen Trifluoride ($NF_3$)/Argon.

| Material | Initial Fluorination, ° C. | Volatile Fluoride Formation, ° C. |
|---|---|---|
| Elemental Uranium (U) | 40-120 | 250 |
| Uranium Dioxide ($UO_2$) | 400 | 540 |
| Uranium Trioxide ($UO_3$) | 230 | 370 |
| Triuranium Octaoxide ($U_3O_8$) | 370 | 430 |
| Uranium Tetrafluoride ($UF_4$) | 350 | 350 |
| Ruthenium Dioxide ($RuO_2$) | 400 | 480 |
| Dirhodium Trioxide ($Rh_2O_3$) | 250 | Not observed |
| Elemental Molybdenum (Mo) | 316 | 316 |
| Molybdenum Dioxide ($MoO_2$) | 305 | 305 |
| Molybdenum Trioxide ($MoO_3$) | 410 | 410 |
| Technetium Dioxide ($TcO_2$) | 40 | 40 |

According to an example implementation for removing select portions and/or elements of material 14, a method for separating components of material 14 can include exposing material 14 to $NF_3$ material to at least partially fluorinate a portion of material 14. The method can then include separating at least one fluorinated component of the fluorinated portion from the uranium material. In accordance with example implementations, the fluorinated portion of material 14, perhaps part or all of material 24, can include U and F. The at least one fluorinated component of the fluorinated portion can also include U and F. In this manner, material 14 including uranium oxide can be fluorinated and the uranium fluoride removed from the remainder of material 14.

Uranium hexafluoride ($UF_6$) volatility can be exploited during uranium isotope enrichment gaseous diffusion or gas centrifuge processes used to produce [235]U-enriched uranium for nuclear reactor fuel and [235]U-weapons. In addition to use in uranium enrichment, actinide volatility could provide the basis for advanced nuclear fuel reprocessing relying on differences in thermal reaction sensitivities and volatilities of residual fuel components, fission products, and actinides arising from irradiation. Actinide volatility reprocessing can provide a simple and compact process for recovering U and Pu from spent nuclear fuel.

The differences in the boiling point or sublimation points for the residual fuel-, fission products-, and actinide fluorides can be exploited through an actinide volatility-based processing approach. The systems and methods of the present disclosure can utilize the reaction thermal sensitivity as well as fractional distillation to separate and recover the valuable used fuel constituents and if desired other valuable constituents such as noble metals.

The actinide volatility-based processing approach can be enhanced through the use of a less aggressive fluorinating agent to increase separation factors and simplify the fractional distillation approach needed to separate and recover volatilized materials. The actinide volatility processing approach can be used to fluorinate the residual fuel (U or Pu), key actinides created during irradiation, and fission products. Embodiments of the systems and methods of the present disclosure can be utilized to perform this approach through providing $NF_3$ material as an effective fluorinating/oxidizing agent that will react with different compounds at different reaction temperatures and rates.

In accordance with these embodiments, $NF_3$ material can have several potential applications in the nuclear fuel cycle. For example: it can be used to prepare the $UF_6$ feed for uranium isotope enrichment; it can be used as the fluorinating agent in the actinide fluoride volatility-based reprocessing scheme; and it can be used as a head-end treatment to separate the bulk of the uranium from the fission products and actinides in used fuel.

material to at least partially fluorinate a portion of material 14. The method can then include separating at least one fluorinated component of the fluorinated portion from the uranium material. In accordance with example implementations, the fluorinated portion of material 14, perhaps part or all of material 24, can include F and U, Pu, Np, Mo, Ru, and/or Tc. The at least one fluorinated component of the fluorinated portion can include F and U, Pu, Np, Mo, Ru, and/or Tc. In this manner, material 14 including irradiated nuclear fuel can be fluorinated and the uranium fluoride as well as actinides removed from the remainder of material 14.

Material 24 can also be treated upon removal from vessel 12, for example, by separation techniques such as high pressure distillation. In accordance with another example implementation, the fluorinated component separated from the uranium material can include F and at least two of U, Pu, Np, Mo, Ru, and/or Tc. The method can further provide for distilling the fluorinated component to acquire a compound that includes F and one of the U, Pu, Np, Mo, Ru, and/or Tc. In this manner highly valuable and/or toxic elements can be removed from the material 24.

Table 2 provides the melting and boiling or sublimation temperatures for fluorides that may form during the fluorination process. The table is divided into three sections based on the relative volatility of the substance or fluoride. Through temperature control, the volatiles can be separated from the non-volatiles and the volatiles can be separated from each other through dynamic reaction and/or selective distillation.

TABLE 2

Melting and Boiling or Sublimation Temperatures of the Fluorides of Residual Fuel, Fission Products, and Actinides.

| | Highly Volatile | | Moderately Volatile | | | Nonvolatile | | |
|---|---|---|---|---|---|---|---|---|
| Substance | $T_{melt}$, °C. | $T_{boil}$, °C. | Fluoride | $T_{melt}$, °C. | $T_{boil}$ or $T_{subl}$, °C. | Fluoride | $T_{melt}$, °C. | $T_{boil}$ or $T_{subl}$, °C. |
| Kr | −157.2 | −153.4 | $IF_7$ | 5 | 4 | AgF | 435 | decomposes |
| $CF_4$ | −184 | −129 | $MoF_6$ | 17.6 | 33.9 | $AgF_2$ | 690 | decomposes |
| Xe | −111.8 | −108.1 | $RuF_6$ | 32.1 | 45.9 | $AmF_4$ | | 513 |
| $TeF_6$ | | −38.6 | $NpF_6$ | 54.8 | 55.2 | $RhF_3$ | | 600 |
| $SeF_6$ | | −34.5 | $TcF_6$ | 37.9 | 55.2 | $SnF_4$ | | 705 |
| | | | $UF_6$ | 64 | 56.5 | $ZrF_4$ | 912 | 918 |
| | | | $PuF_6$ | 51.9 | 62.2 | $PuF_4$ | 1037 | 927 |
| | | | $IF_5$ | 9.4 | 98 | CsF | 703 | 1231 |
| | | | $SbF_5$ | 6 | 142.7 | RbF | 760 | 1410 |
| | | | $NbF_5$ | 80 | 235 | $UF_4$ | 1036 | 1450 |
| | | | $RuF_5$ | 101 | 70 | $AmF_3$ | 1427 | 2067 |
| | | | $RhF_5$ | | 95.5 | $CmF_3$ | 1406 | |
| | | | $RhF_6$ | 70 | 73.5 | $YF_3$ | 1136 | 2230 |
| | | | | | | $BaF_2$ | 1353 | 2260 |
| | | | | | | EuF3 | 1276 | 2280 |
| | | | | | | $GdF_3$ | 1380 | 2280 |
| | | | | | | •$CeF_4$ | 838 | decomposes |
| | | | | | | $CeF_3$ | 1430 | 2330 |
| | | | | | | $PmF_3$ | 1410 | 2330 |
| | | | | | | $SmF_3$ | 1306 | 2330 |
| | | | | | | $SrF_2$ | 1400 | 2460 |

Because of potential differences between the thermal fluorination chemistry of $NF_3$ and $HF/F_2$, $NF_3$ can provide a more tunable chemistry and thus provide greater separation factors during recovery of uranium, plutonium, and neptunium from spent nuclear fuel. This chemistry may also be used to cause release of volatile radionuclides in a form that can easily be managed.

As another example, the method for separating components of material 14 can include exposing material 14 to $NF_3$ Through converting uranium compounds to $UF_6$, and technetium compounds to volatile technetium fluorides, the systems and methods of the present disclosure may be used as a direct substitute for aqueous reprocessing or as a head-end treatment in an aqueous-based reprocessing flow sheet.

In accordance with example implementations, utilizing the systems and methods of the present disclosure, as well as the data of tables 1 and 2, very focused fluorination and separation can be performed to recover and/or separate valuable and/or toxic materials. For example, highly valuable uranium can be recovered from ore or spent fuel. As another example, Mo, particularly $Mo^{99}$, can be recovered from irradiated fuel and/or recovered from an irradiated target for use as a medical isotope. Still further, toxic compounds whose presence dictates that the material they are present in be stored at great expense, can be removed from the material and thereby lessen the cost of material storage.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

What is claimed is:

1. A method for selectively separating actinides and/or fission products from irradiated uranium material, the method comprising:
   providing non-fluorinated irradiated uranium material, the material comprising actinides and/or fission products, the actinides and/or fission products comprising one or more of Ru, Rh, Mo, Tc, Np, Pu, Sb, Ag, Am, Sn, Zr, Cs, Th, and/or Rb;
   selectively fluorinating at least one of the U, Ru, Rh, Mo, Tc, Np, Pu, Sb, Ag, Am, Sn, Zr, Cs, Th, and/or Rb of the non-fluorinated irradiated uranium material by exposing the non-fluorinated irradiated uranium material to $NF_3$ material; and
   selectively separating at least one of the fluorinated U, Ru, Rh, Mo, Tc, Np, Pu, Sb, Ag, Am, Sn, Zr, Cs, Th, and/or Rb from the exposed irradiated uranium material.

2. The method of claim 1 wherein U is selectively fluorinated.

3. The method of claim 1 wherein one or more of U, Pu, Np, Mo, Ru, and/or Tc is selectively fluorinated.

4. The method of claim 1 wherein one or more of Pu, Np, Mo, Ru, and/or Tc is selectively fluorinated.

5. The method of claim 1 wherein the separating comprises distilling the fluorinated U, Ru, Rh, Mo, Tc, Np, Pu, Sb, Ag, Am, Sn, Zr, Cs, Th, and/or Rb, to acquire a compound comprising F and one or more of U, Ru, Rh, Mo, Tc, Np, Pu, Sb, Ag, Am, Sn, Zr, Cs, Th, and/or Rb while other fluorinated actinides remain with the fluorinated U.

6. The method of claim 1 wherein the irradiated uranium material comprises uranium oxide.

7. The method of claim 6 wherein the irradiated uranium material comprises one or both of $UO_2$ and/or $UO_3$.

8. The method of claim 1 wherein one or more of Pu, Np, Mo, Ru, and Tc are fluorinated with the $NF_3$ to form one or more $PuF_6$, $NpF_6$, $MoF_6$, $RuF_6$ and $TcF_6$.

9. The method of claim 1 wherein a temperature of the irradiated uranium material is greater than 400° C. during the selectively fluorinating.

10. The method of claim 1 wherein the selectively fluorinating the one or more of the U, Ru, Rh, Mo, Tc, Np, Pu, Sb, Ag, Am, Sn, Zr, Cs, Th, and/or Rb, comprises fluorinating at a predefined temperature associated with the separation of one or more of the U, Ru, Rh, Mo, Tc, Np, Pu, Sb, Ag, Am, Sn, Zr, Cs, Th, and/or Rb.

11. The method of claim 10 wherein the predefined temperature is from 230 C to 400 C during the fluorination of U.

12. The method of claim 10 wherein the predefined temperature is at least 400 C during the fluorination of Ru.

13. The method of claim 10 wherein the predefined temperature is at least 250 C during the fluorination of Rh.

14. The method of claim 10 wherein the predefined temperature is at least 305 C during the fluorination of Mo.

15. The method of claim 10 wherein the predefined temperature is from 305 C to 410 C during the fluorination of Mo.

16. The method of claim 10 wherein the predefined temperature is at least 40 C during the fluorination of Tc.

* * * * *

UNITED STATES PATENT AND TRADEMARK OFFICE
CERTIFICATE OF CORRECTION

| | | |
|---|---|---|
| PATENT NO. | : 8,867,692 B2 | |
| APPLICATION NO. | : 12/511573 | |
| DATED | : October 21, 2014 | |
| INVENTOR(S) | : Randall D. Scheele et al. | |

It is certified that error appears in the above-identified patent and that said Letters Patent is hereby corrected as shown below:

On The Title Page,

Item (56) References Cited – Replace "Levitz et al., "Engineering Develompment of Fuiid-Bed Fluoride Volatility Processed", Part 14, "Processing Experience in Fluorinating Plutonium Materials and Thermally Decomposing Plutonium Hexafluoride in the Engineering-scale Alpha Facility", Argonne National Laboratory, ANL-7473, Nov. 1969." with --Levitz et al., "Engineering Development of Fluid-Bed Fluoride Volatility Processed", Part 14, "Processing Experience in Fluorinating Plutonium Materials and Thermally Decomposing Plutonium Hexafluoride in the Engineering-scale Alpha Facility", Argonne National Laboratory, ANL-7473, Nov. 1969.--

Item (56) References Cited – Replace "Jan Uhlir, et al., "Fluoride volatility method for reprocessing of LWR and FR fuels", Journal of Fluorine Chemistry 130 (2009) 89-83." with --Jan Uhlir, et al., "Fluoride volatility method for reprocessing of LWR and FR fuels", Journal of Fluorine Chemistry 130 (2009) 89-93.--

In The Specification,

Column 1, line 9 – Replace "filed on filed Jul." with --filed on Jul.--

Column 2, line 42 – Replace "14(·)." with --14(∗).--

Column 8, table 2 – Replace "EuF3" with --EUF$_3$--

Column 10, line 27 – Replace "230 C to 400 C" with --230° C to 400° C--

Column 10, line 29 – Replace "400 C" with --400° C--

Signed and Sealed this
Ninth Day of February, 2016

Michelle K. Lee
*Director of the United States Patent and Trademark Office*

In The Specification,

Column 10, line 31 – Replace "250 C" with --250° C--

Column 10, line 33 – Replace "305 C" with --305° C--

Column 10, line 35 – Replace "305 C to 410 C" with --305° C to 410° C--

Column 10, line 37 – Replace "40 C" with --40° C--